US012462927B2

(12) United States Patent
Nath et al.

(10) Patent No.: US 12,462,927 B2
(45) Date of Patent: Nov. 4, 2025

(54) METHODS AND SYSTEMS TO OPTIMIZE THE UTILIZATION OF HEALTH WORKER AND ENHANCE HEALTHCARE COVERAGE FOR POPULATION TO DELIVER CRITICAL/IN-NEED HEALTHCARE SERVICES

(71) Applicant: CERNER INNOVATION, INC., Kansas City, KS (US)

(72) Inventors: Pratik Nath, Bangalore (IN); Ankur Chatter, Rajasthan (IN); Manish Tahiliani, Lucknow (IN); Shirshandu Bhattacharjee, Bangalore (IN); Kishore Kumar Naik Pujari, Bangalore (IN)

(73) Assignee: CERNER INNOVATION, INC., Kansas City, KS (US)

( * ) Notice: Subject to any disclaimer, the term of this patent is extended or adjusted under 35 U.S.C. 154(b) by 99 days.

(21) Appl. No.: 17/522,537

(22) Filed: Nov. 9, 2021

(65) Prior Publication Data

US 2023/0143289 A1 May 11, 2023

(51) Int. Cl.
| | |
|---|---|
| *G16H 40/20* | (2018.01) |
| *G16H 10/60* | (2018.01) |
| *H04W 4/021* | (2018.01) |

(52) U.S. Cl.
CPC ............. *G16H 40/20* (2018.01); *G16H 10/60* (2018.01); *H04W 4/021* (2013.01)

(58) Field of Classification Search
CPC ........ G16H 40/20; G16H 10/60; G16H 40/67; G16H 50/20; H04W 4/021; H04W 12/104; H16H 40/63
See application file for complete search history.

(56) References Cited

U.S. PATENT DOCUMENTS

| | | |
|---|---|---|
| 6,529,164 B1 | 3/2003 | Carter |
| 7,433,694 B2 | 10/2008 | Morgan et al. |
| | (Continued) | |

FOREIGN PATENT DOCUMENTS

| | | |
|---|---|---|
| WO | 2015/149073 A1 | 10/2015 |
| WO | 2015/170228 A1 | 11/2015 |
| | (Continued) | |

OTHER PUBLICATIONS

Alisky, Joseph. Integrated electronic monitoring systems could revolutionize care for patient with cognitive impairment. 2006. 66, 1161-1164. (Year: 2006).*

(Continued)

*Primary Examiner* — Christopher L Gilligan
*Assistant Examiner* — Tristan Isaac Evans
(74) *Attorney, Agent, or Firm* — Kraguljac Law Group LLC (57) ABSTRACT

Methods, systems, and computer storage media are provided for utilizing health resources and enhancing healthcare coverage based on patient locations. A health resource navigation system is structured to generate an area roster based on one or more geo-fenced areas, determine a user device location as the user device navigates to a geo-fenced area corresponding to an indication of area selection, generate a patient roster based on the geo-fenced area, determine the user device location as the user device navigates to a patient location corresponding to an indication of patient selection, receive an indication of arrival at the patient location, receive patient information at the patient location, the patient information corresponding to a patient associated with the indication of the patient selection, and generate one or more patient recommendations based on one or more secondary patient locations and one or more stay durations responsive to the received patient information.

20 Claims, 4 Drawing Sheets

(56) References Cited

U.S. PATENT DOCUMENTS

| | | | |
|---|---|---|---|
| 8,799,799 | B1 | 8/2014 | Cervelli et al. |
| 9,104,695 | B1 | 8/2015 | Cervelli et al. |
| 9,538,332 | B1 | 1/2017 | Mendelson |
| 9,760,556 | B1 | 9/2017 | Knudson et al. |
| 9,785,744 | B2 | 10/2017 | Johnson et al. |
| 10,007,758 | B2 | 6/2018 | Al-Ali et al. |
| 10,584,968 | B2 * | 3/2020 | Wang .................. G06K 7/10386 |
| 10,721,333 | B2 * | 7/2020 | Spear ...................... G16H 10/60 |
| 10,874,796 | B2 | 12/2020 | Tsoukalis |
| 11,922,530 | B2 * | 3/2024 | Di Lorenzo ..... G06Q 10/06312 |
| 12,328,637 | B2 * | 6/2025 | Hou ....................... H04W 4/021 |
| 2011/0245630 | A1 * | 10/2011 | St. Pierre ............... G16H 15/00 |
| | | | 600/301 |
| 2012/0323595 | A1 * | 12/2012 | Hawkins ................ G16H 40/20 |
| | | | 705/2 |
| 2019/0147138 | A1 * | 5/2019 | Jaiswal .................. G16H 50/20 |
| | | | 705/2 |
| 2020/0329334 | A1 * | 10/2020 | Kurian ................... H04W 12/64 |
| 2021/0183502 | A1 * | 6/2021 | Silverstein ............. G16H 40/20 |
| 2021/0224893 | A1 * | 7/2021 | Garner, IV ............. G06Q 40/02 |

FOREIGN PATENT DOCUMENTS

| | | | | |
|---|---|---|---|---|
| WO | WO-2017074573 | A1 * | 5/2017 | ............ H04W 4/021 |
| WO | WO-2020176991 | A1 * | 9/2020 | ......... G06F 16/9566 |

OTHER PUBLICATIONS

Tan. IoT Geofencing for COVID-19 Home Quarantine Enforcement. IEEE Internet of Things Magazine. Sep. 2020. (Year: 2020).*

Dynafios TRACE Time Tracking Software, available online at: <https://www.dynafios.com/products/trace-time-tracking-software/>, 6 pages, Jan. 6, 2022.

Hubstaff, Healthcare Company Setup in Hubstaff; Available online at: <https://support.hubstaff.com/setting-up-hubstaff-for-your-healthcare-company/>, 18 pages, Jan. 6, 2022.

* cited by examiner

METHODS AND SYSTEMS TO OPTIMIZE THE UTILIZATION OF HEALTH WORKER AND ENHANCE HEALTHCARE COVERAGE FOR POPULATION TO DELIVER CRITICAL/IN-NEED HEALTHCARE SERVICES

BACKGROUND

There is a gap between the demand for healthcare services and the supply of healthcare resources (e.g., healthcare workers) to provide quality healthcare services that meet the needs of the demand. In general, a patient presents to a healthcare facility or provider. Often times, the patient schedules an appointment with a healthcare provider and waits to be seen by a healthcare worker. Because the demand for healthcare services is greater than the supply of healthcare resources, the patient usually has to wait days or months before the patient can be seen. The patient may physically go to an office or healthcare facility of the provider to receive care at the scheduled date and time. To address the supply and demand gap, a patient may be seen by a healthcare worker via a virtual telehealth appointment. However, the healthcare worker may instruct the patient to physically come into the office to better assess the health issue which results in the need to schedule another appointment, increases costs, and prolongs access to healthcare services.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to utilizing health resources and enhancing healthcare coverage via a health resource system. In particular, the present invention utilizes health resources and enhances healthcare coverage based on patient location. An area roster is generated via a health resource system based on one or more geo-fenced areas. The health resource system determines a user device location as the user device navigates to a geo-fenced area corresponding to an indication of area selection. The health resource system then generates a patient roster based on the geo-fenced area. The health resource system determines the user device location as the user device navigates to a patient location corresponding to an indication of patient selection. An indication of arrival at the patient location is received by the health resource system. The health resource system receives patient information at the patient location. Responsive to the received patient information, one or more patient recommendations are generated, by the health resource system, based on one or more secondary patient locations and one or more stay durations.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

As noted herein, a gap exists between the demand for healthcare services and the supply of healthcare resources (e.g., healthcare workers) to provide quality healthcare services. To address the supply and demand gap, a patient may have to wait days or months to be seen or may have to rely on telehealth. The healthcare worker may instruct the patient to come into the office to better assess the health issue which results in time and resource inefficiencies, increased costs, and prolonged access to healthcare services.

Accordingly, in one aspect, an embodiment is directed to one or more computer storage media having computer-executable instructions embodied thereon that, when executed by a computer, causes the computer to perform operations. The operations include generating, via a health resource navigation system, an area roster based on one or more geo-fenced areas. The operations also include determining, via the health resource navigation system, a user device location as the user device navigates to a geo-fenced area corresponding to an indication of area selection. The indication of the area selection correlates to one or more geo-fenced areas from the area roster. The operations further include generating, via the health resource navigation system, a patient roster based on the geo-fenced area. The operations also include determining, via the health resource navigation system, the user device location as the user device navigates to a patient location corresponding to an indication of patient selection. The indication of the patient selection correlates to one or more patients from the patient roster. The operations include receiving, via the health resource navigation system, an indication of arrival at the patient location. The operations include receiving, via the health resource navigation system, patient information at the patient location. The patient information corresponds to a patient associated with the indication of the patient selection. The operations also include generating, via the health resource navigation system, one or more patient recommendations based on one or more secondary patient locations and one or more stay durations responsive to the received patient information.

In another aspect of the invention, an embodiment of the present invention is directed to a method. The method includes generating, via a health resource navigation system, a patient roster based on a geo-fenced area. The method also includes providing, via the health resource navigation system, the patient roster to a user device. The method further includes determining, via the health resource navigation system, a user device location as the user device navigates to a patient location corresponding to an indication of patient selection. The indication of the patient selection correlates to one or more patients from the patient roster. The method also includes receiving, via a health resource navigation system, an indication of arrival at the patient location. The method also includes receiving, via the health resource navigation system, patient information at the patient location, the patient information corresponding to a patient associated with the indication of the patient selection. The method also includes generating, via the health resource navigation system, one or more patient recommendations based on one or more secondary patient locations and one or more stay durations responsive to the received patient information.

In a further aspect, an embodiment is directed to a system that includes one or more processors and a non-transitory computer storage medium storing computer-useable instructions that, when used by the one or more processors, cause the one or more processors to generate, via a health resource navigation system, a patient roster based on a geo-fenced area, provide the patient roster to a user device, determine a user device location as the user device navigates to a patient location corresponding to an indication of patient selection, wherein the indication of the patient selection correlates to one or more patients from the patient roster, receive an indication of arrival at the patient location, receive patient information at the patient location, the patient information corresponding to a patient associated with the indication of the patient selection, and generate one or more patient recommendations based on one or more secondary patient locations and one or more stay durations responsive to the received patient information.

Figure 1:
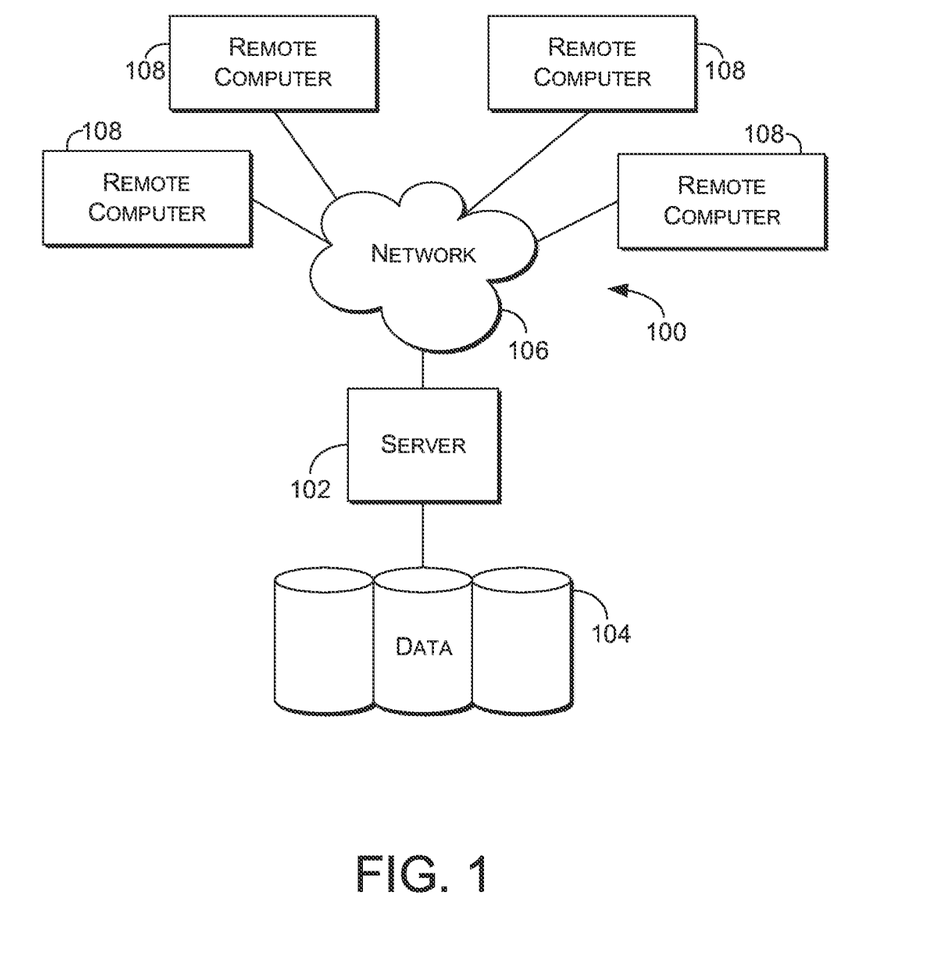
FIG. 1 is a block diagram of an exemplary computing environment suitable for use in implementing the present disclosure.

An exemplary computing environment suitable for use in implementing embodiments of the present invention is described below. FIG. 1 is an exemplary computing environment (e.g., medical-information computing-system environment) with which embodiments of the present invention may be implemented. The computing environment is illustrated and designated generally as reference numeral 100. The computing environment 100 is merely an example of one suitable computing environment and is not intended to suggest any limitation as to the scope of use or functionality of the invention. Neither should the computing environment 100 be interpreted as having any dependency or requirement relating to any single component or combination of components illustrated therein.

The present invention might be operational with numerous other computing system environments or configurations. Examples of well-known computing systems, environments, and/or configurations that might be suitable for use with the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention might be described in the general context of computer-executable instructions, such as program circuitry, being executed by a computer. Exemplary circuitry (e.g., program circuitry or any other suitable circuitry) include circuits (e.g., circuits that include resistors, transistors, capacitors, inductors, diodes, and/or any suitable component whether hardware and/or programmatic code), routines, programs, objects, components, and/or data structures that perform particular tasks or implement particular abstract data types. The present invention might be practiced in distributed computing environments where tasks are performed by remote processing devices that are linked through a communications network. In a distributed computing environment, program circuitry might be located in association with local and/or remote computer storage media (e.g., memory storage devices).

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The control server 102 typically includes therein, or has access to, a variety of computer-readable media. Computer-readable media can be any available media that might be accessed by control server 102, and includes volatile and nonvolatile media, as well as, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program circuitry or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Communication media typically embodies computer-readable instructions, data structures, program circuitry or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, ambulatory settings, medical billing and financial offices, hospital administration settings, home healthcare environments, clinicians' offices, Center for Disease Control, Centers for Medicare & Medicaid Services, World Health Organization, any governing body either foreign or domestic, Health Information Exchange, and any healthcare/government regulatory bodies not otherwise mentioned. Clinicians may comprise a treating physician or physicians, specialists such as intensivists, surgeons, radiologists, cardiologists, and oncologists, emergency medical technicians, physicians' assistants, nurse practitioners, nurses, nurses' aides, pharmacists, dieticians, microbiologists, laboratory experts, laboratory technologists, genetic counselors, researchers, students, and the like. The remote computers 108 might also be physically located in nontraditional medical care environments so that the entire healthcare community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program circuitry or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, a touch display, or a touch pad. Other input devices include microphones, satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

Figure 2:
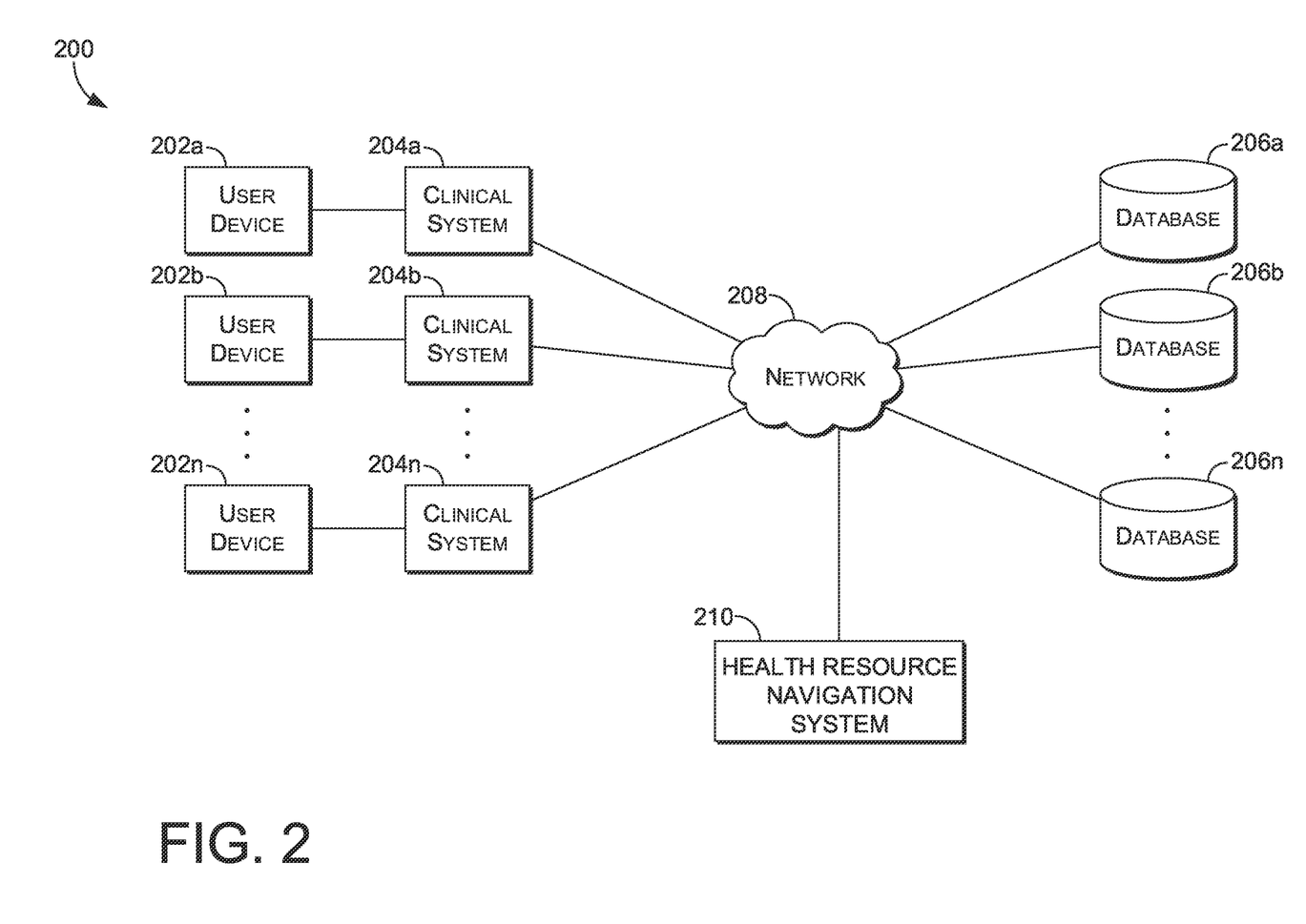
FIG. 2 is a block diagram of an exemplary system for utilizing health resources and enhancing healthcare coverage, in accordance with an embodiment of the present disclosure.

Turning now to FIG. 2, an exemplary clinically driven health resource system 200 is depicted suitable for use in implementing embodiments of the present invention. The clinically driven health resource system 200 is merely an example of one suitable computing system environment and is not intended to suggest any limitation as to the scope of use or functionality of embodiments of the present invention. Neither should the health resource system 200 be interpreted as having any dependency or requirement related to any single system, device, and/or component or combination of systems, devices, and/or components illustrated therein.

The clinically driven health resource system 200 includes the user device(s) 202a-202n, clinical system(s) 204a-204n, database(s) 206a-206n, and health resource navigation system 210, all in communication with one another via a network 208. The network 208 may include, without limitation, one or more secure local area networks (LANs) or wide area networks (WANs). The network 208 may be a secure network associated with a facility such as a healthcare facility. The secure network may require that a user log in and be authenticated in order to send and/or receive information over the network.

The systems, devices, and/or components illustrated in FIG. 2 are exemplary in nature and in number and should not be construed as limiting. Any number of systems, devices, and/or components may be employed to achieve the desired functionality within the scope of embodiments hereof. Further, the systems, devices, and/or components may be located on any number of servers. By way of example only, the health resource navigation system 210 might reside on a server, cluster of servers, or a computing device remote from one or more of the remaining components. Although illustrated as separate systems, the functionality provided by each of these components might be provided as a single system, device, and/or component. The single unit depictions are meant for clarity, not to limit the scope of embodiments in any form.

Components of the clinically driven health resource system 200 may include a processing unit, internal system memory, and a suitable system bus for coupling various system components, including one or more data stores for storing information (e.g., files and metadata associated therewith). Components of the clinically driven health resource system 200 typically includes, or has access to, a variety of computer-readable media.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other systems, devices, and/or components, and in any suitable combination and location. Various functions described herein as being performed by one or more entities may be carried out by hardware, firmware, and/or software. For instance, various functions may be carried out by a processor executing instructions stored in memory.

Each of clinical system 204a-204n includes or has access to infrastructure that is capable of receiving and communicating information for use by, for example, the health resource navigation system 210. The information received and communicated in association with each of clinical system 204a-204n may comprise general information used by the health resource navigation system 210. Each of the clinical systems 204a-204n may receive data from the user device(s) 202a-202n or other systems (e.g., disparate healthcare systems), which may include any number or type of medical devices that may be utilized to provide or measure patient care to a patient.

Each of the clinical systems 204a-204n includes or has access to infrastructure that is capable of storing electronic health records (EHRs), such as database(s) 206a-206n of patients associated with clinical system(s) 204a-204n. EHRs may comprise electronic clinical documents such as images, clinical notes, orders, summaries, reports, analyses, or other types of electronic medical documentation relevant to a particular patient's condition and/or treatment. Electronic clinical documents contain various types of information relevant to the condition and/or treatment of a particular patient and can include information relating to, for example, patient identification information, images, alert history, culture results, physical examinations, vital signs, past medical histories, surgical histories, family histories, histories of present illnesses, current and past medications, allergies, symptoms, past orders, completed orders, pending orders, tasks, lab results, other test results, patient encounters and/or visits, immunizations, physician comments, nurse comments, other caretaker comments, and a host of other relevant clinical information. In some embodiments, the clinical systems 204a-204n may receive data from health information exchanges ("HIEs"), personal health records ("PHRs"), patient claims, and other health records associated with a patient.

The user device(s) 202a-202n may be any type of computing device used within a healthcare facility or as part of the claims processing process to receive, display, and send information to another user or system. The user device(s) 202a-202n may be capable of communicating via the network with the clinical system(s) 204a-204n, database(s) 206a-206n, or health resource navigation system 210. Such devices may include any type of mobile and portable devices including cellular telephones, personal digital assistants, tablet PCs, smart phones, and the like.

The user device(s) 202a-202n is configured to display information to a clinician or user via a display. The information may include communications initiated by and/or received by the health resource navigation system 210. Embodiments are not intended to be limited to visual display but rather may also include audio presentation, visual presentation, combined audio/visual presentation, and the like.

Generally, the health resource navigation system 210 is structured to track, monitor, and/or generate recommendations corresponding to health resources based on patient location(s). For example, the health resource navigation system 210 may leverage one or more Global Positioning Systems (GPS), near field communication, wireless networks, telecommunication networks, and/or triangulation locating techniques. The health resource navigation system 210 may utilize health resources and enhance healthcare coverage based on patient location. Although the health resource navigation system 210 is depicted as a single system, it is contemplated that each clinical system 204a-204n may utilize a different health resource navigation system. Further description of the health resource navigation system 210 is provided herein with reference to FIG. 3.

Figure 3:
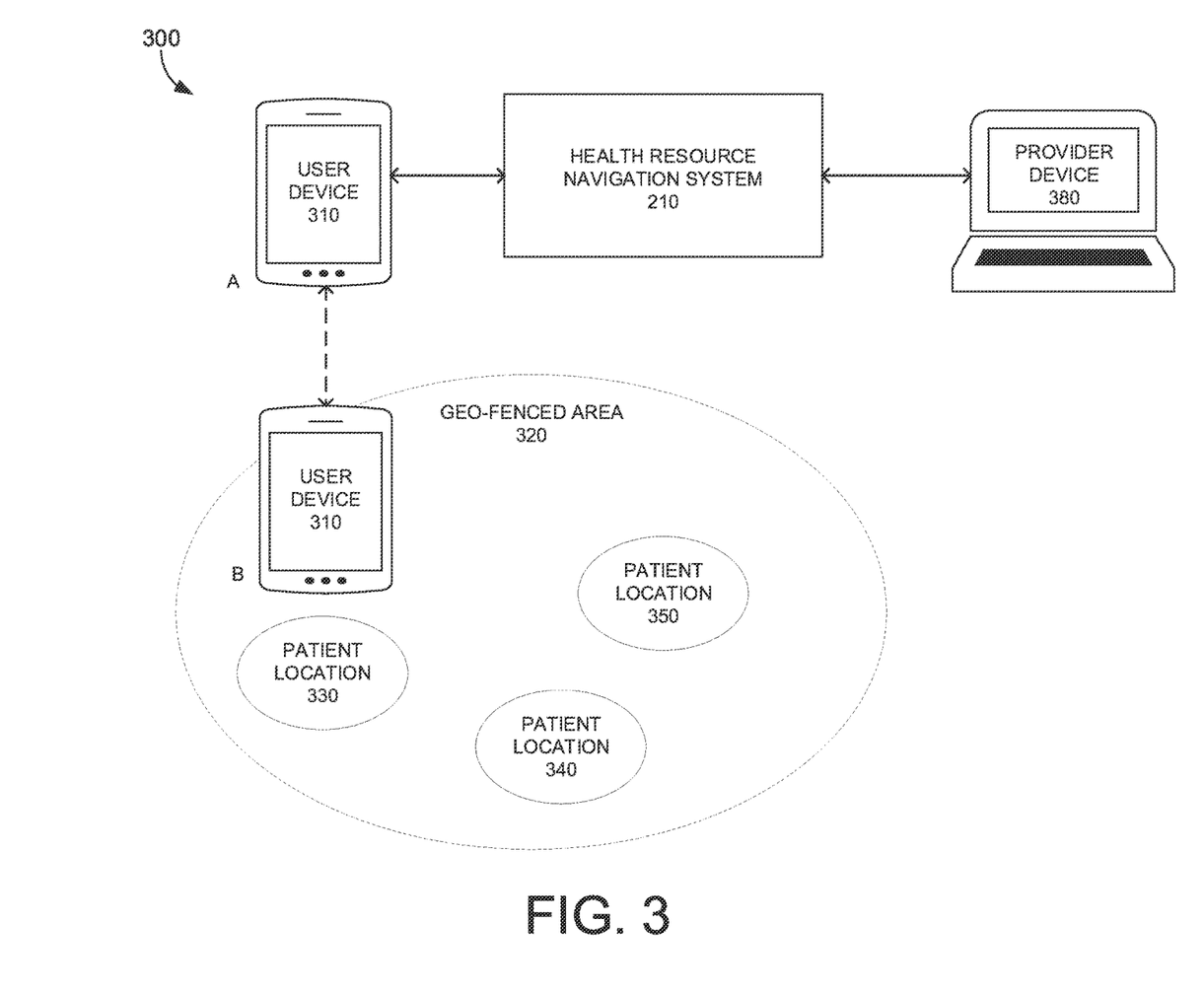
FIG. 3 is a block diagram of an exemplary implementation of a health resource navigation system, in accordance with some embodiments of the present disclosure.

FIG. 3 is a block diagram of an exemplary implementation of a health resource navigation system according to an example embodiment. The health resource navigation system 210 may include one or more circuits, systems, routines, objects, and/or components.

In some embodiments, the health resource navigation system 210 may generate an area roster (e.g., a list of areas where healthcare services may be provided) based on one or more geo-fenced areas. For example, the health resource navigation system 210 may generate an area roster based on the geo-fenced area 320 such that a plurality of healthcare services that are capable of delivery or performance within the geo-fenced area 320 are included in the area roster. Each area in the area roster may be associated with a predefined and unique geo-fence, which may or may not overlap with other geo-fences of other areas in the same area roster or in a different area roster. In some examples, the health resource navigation system 210 may receive one or more areas (e.g., geo-fenced areas) that may be correlated to or otherwise assigned to one or more healthcare resources (e.g., healthcare workers). Examples of an area include one or more states, cities, townships, zip codes, regions, countries, continents, etc. The area(s) and/or the healthcare resource(s) may be associated with healthcare services to be provided. In some examples, the healthcare services may be associated with instructions that aid in the provision of the healthcare services. The health care services may include, but are not limited to, first aid as a result of an accident, dental care, pharmaceutical care and/or medicine delivery, laboratory care (e.g., taking blood or fluids for testing, etc.), home care (e.g., home care for elder care, geriatric care, etc.), physical therapy, etc. The health resource navigation system 210 may generate the area roster responsive to authentication of a healthcare resource (e.g., a healthcare worker) to the health resource navigation system 210 directly or indirectly. The area roster may be rendered or otherwise displayed via a user interface (e.g., a dashboard and/or any other user interface) associated with the health resource navigation system 210.

In some embodiments, the health resource navigation system 210 may determine a user device location as the user device navigates to a geo-fenced area corresponding to an indication of area selection, using GPS, near field communication, wireless networks, telecommunication networks, and/or triangulation techniques for real-time and/or near real-time location tracking. The indication of the area selection may correspond to an area from the area roster that may be selected based on the click of a button, receipt of an audible command (e.g., receipt of a voice command), and/or any other suitable selection. The indication of the area selection may correlate to one or more geo-fenced areas (e.g., the geo-fenced area 320) from the area roster. The user device location may be determined as the user device 310 moves from the user device location A towards the geo-fenced area 320 at user device location B corresponding to the indication of area selection. In some examples, the user device location may correlate to a longitude location and a latitude location of the user device in real-time or near real-time. In this regard, the health resource navigation system 210 may track the location of a healthcare resource in real-time, or near real-time, using sequentially determined pairs of longitude location(s) and a latitude location(s) of the user device 310 observed at one or more points in time as the user device 310 navigates in a direction toward the geo-fenced area that is selected.

In some embodiments, the health resource navigation system 210 may be structured to generate a notification. The notification may be associated with a minimum distance associated with the geo-fenced area. For example, when real-time or near real-time location of the user device 310 is determined to be at or within a threshold distance relative to an outer boundary of the geo-fenced area, the health resource navigation system 210 may generate and/or send a notification to a provider device 380 that the user device 310 has reached the selected geo-fenced area 320. The threshold distance may be used to set a proximity zone or buffer-area surrounding the boundaries of the geo-fenced area 320 in order to represent a minimal proximity relative to the interior of the geo-fenced area 320.

The health resource navigation system 210 may generate a patient roster (e.g., a list of one or more patients) based on a geo-fenced area. The patient roster may include at least one identifier (e.g., a patient name, patient number, and/or any other suitable identifier) correlating to at least one patient. The patient data associated with one or more patients may be stored in or otherwise received by the health resource navigation system 210. As electronically stored in a database and/or retrieved from an EHR, the patient data may be tagged with one or more patient locations that are correlated to one or more patients. For example, a unique patient identifier may be tagged with one or more locations identifying the home address of the patient, work address of the patient, or any other location of the patient. In this regard, the health resource navigation system 210 may generate the patient roster (e.g., a suggested list of patients and/or patient locations) according to the patient location(s) nearest to the user device location (e.g., the user device location B). For example, the health resource navigation system 210 may generate a patient roster that includes the patient location 330, patient location 340, patient location 350, and/or any other patient location that is nearest to the user device location (e.g., the user device location B). In some embodiments, the health resource navigation system 210 may generate the patient roster based on one or more areas/regions associated with (e.g., assigned to) a healthcare resource. As such, the patient roster generated by the health resource navigation system 210 defines a group of individuals that are located within or otherwise proximate to the area selected from the area roster and its corresponding geo-fenced area.

In some examples, the health resource navigation system 210 may provide the patient roster to a user device such that the patient roster may be rendered or otherwise displayed via a user interface (e.g., a dashboard and/or any other user interface) associated with the health resource navigation system and/or the user device.

In some embodiments, the health resource navigation system 210 may determine the user device location as the user device navigates to a patient location corresponding to an indication of patient selection. For example, the health resource navigation system 210 may track the location of a healthcare worker as the user device 310 moves toward the patient location selected. The indication of the patient selection may correlate to one or more patients and/or patient locations from the patient roster. The indication of the patient selection may correlate to one or more patients and/or patient locations that may be selected based on the click of a button, receipt of an audible command (e.g., receipt of a voice command), and/or any other suitable selection. The user device location may correlate to a longitude location and a latitude location of the user device in real-time or near real-time as the user device navigates toward the patient location. In some embodiments, the health resource navigation system 210 may assist the healthcare resource in navigating to a patient location. For example, the health resource navigation system 210 may generate directions and/or provide to the user device 310 directions from a present location to the patient location. The directions may be output or otherwise displayed via a user interface associated with the user device.

In some embodiments, the health resource navigation system may be structured to generate a notification. The notification may be associated with a minimum distance corresponding to a patient location. In some examples, the health resource navigation system 210 may include a minimum distance that has been configured for all areas/regions that a healthcare resource may navigate to be considered as having reached the patient location. Accordingly, the health resource navigation system 210 may provide (e.g., send, transmit, etc.) a notification to the provider device 380 when the user device 310 reaches the vicinity or close proximity of the patient location (e.g., the patient location 330).

In some examples, the health resource navigation system 210 may receive an indication of arrival at the patient location. The indication of arrival (e.g., a notification of arrival) may be received when the user device 310 reaches the patient location (e.g., the patient location 330). The indication of arrival may be provided (e.g., sent, transmitted, etc.) by the user device 310 to the health resource navigation system 210 and/or the provider device 380 directly or indirectly. For example, the indication of arrival may be received when the user device location arrives at, or within the threshold distance of, the patient location 330. Alternatively or additionally, the indication of arrival may be received when a button (e.g., a check-in button that indicates the start of the service to the patient) is clicked via a user interface of the user device. A timer may track a stay duration in response to the indication of arrival at the patient location such that the health resource navigation system 210 may track the time spent per patient. Advantageously, the health resource navigation system 210 ensures that the healthcare resource is spending quality time with the patient as the healthcare resource attends to the care of the patient.

In some embodiments, the health resource navigation system 210 may receive patient information at the patient location. The patient information may correspond to the patient associated with the indication of the patient selection. As used herein, the term "patient information" may include exam information, chart information, and/or any other suitable information associated with the health and/or identification of a patient. For example, the patient information may be received by the user device 310 responsive to the healthcare resource entering the patient information before, during, and/or after performing one or more care services (e.g., performing a screening, exam, or otherwise delivering healthcare services to the patient). The health resource navigation system 210 may receive or otherwise retrieve patient information corresponding to the patient from the user device 310, database(s) 206a-206n, memory, clinical system(s) 204a-204n, and/or any other suitable system, database, or server whether directly or indirectly communicatively coupled to the health resource system 200.

Alternatively or additionally, the timer may stop tracking the stay duration in response to receiving an indication of completion that may be received when a button (e.g., a check-out button) is clicked via a user interface of the user device.

In some embodiments, the health resource navigation system 210 may generate one or more patient recommendations based on one or more secondary patient locations and stay duration(s) responsive to the received patient information. The patient recommendation may indicate which patients the healthcare resource may reach out to during the remainder of their shift (e.g., the remainder of the morning, afternoon, day, etc.). In some embodiments, the health resource navigation system 210 may generate a secondary patient roster based on the geo-fenced area and/or the user device location (e.g., the current location of the user device). The secondary patient roster may include or omit any or all of the patients included in the original patient roster, for example. Alternatively or additionally, the patient recommendation(s) may be generated responsive to the indication of completion received. To provide the one or more recommendations, the health resource navigation system 210 may analyze one for more care factors (e.g., the stay duration(s), secondary patient location(s) (e.g., location of the remaining patient(s)), the healthcare service to be provided, and/or any other suitable factor). The health resource navigation system 210 may generate the patient recommendation(s) and/or provide the patient recommendation(s) to the user device 310. The user device 310 may render, output, or otherwise display the patient recommendation(s) via a user interface associated with the user device 310.

In some examples, the health resource navigation system 210 may generate a report (e.g., a quality metrics report) based on the activities during a period (e.g., during a day, week, month, and/or any other suitable period of time). In some embodiments, the report may include information derived from or otherwise based on the timer. For example, the report may include the stay duration associated with one or more patients, patient locations, etc. The health resource navigation system 210 may provide the quality metrics report to the provider device 380. For example, the health resource navigation system 210 may provide the report to the provider device 380 associated with a healthcare provider at the end of the day for one or more healthcare resources and/or the activities throughout the day. Alternatively or additionally, the report may track the progress of one or more healthcare resources. In some embodiments, the health resource navigation system 210 may determine a value of savings (e.g., a value associated with recommended activities, manual activities, etc.).

Figure 4:
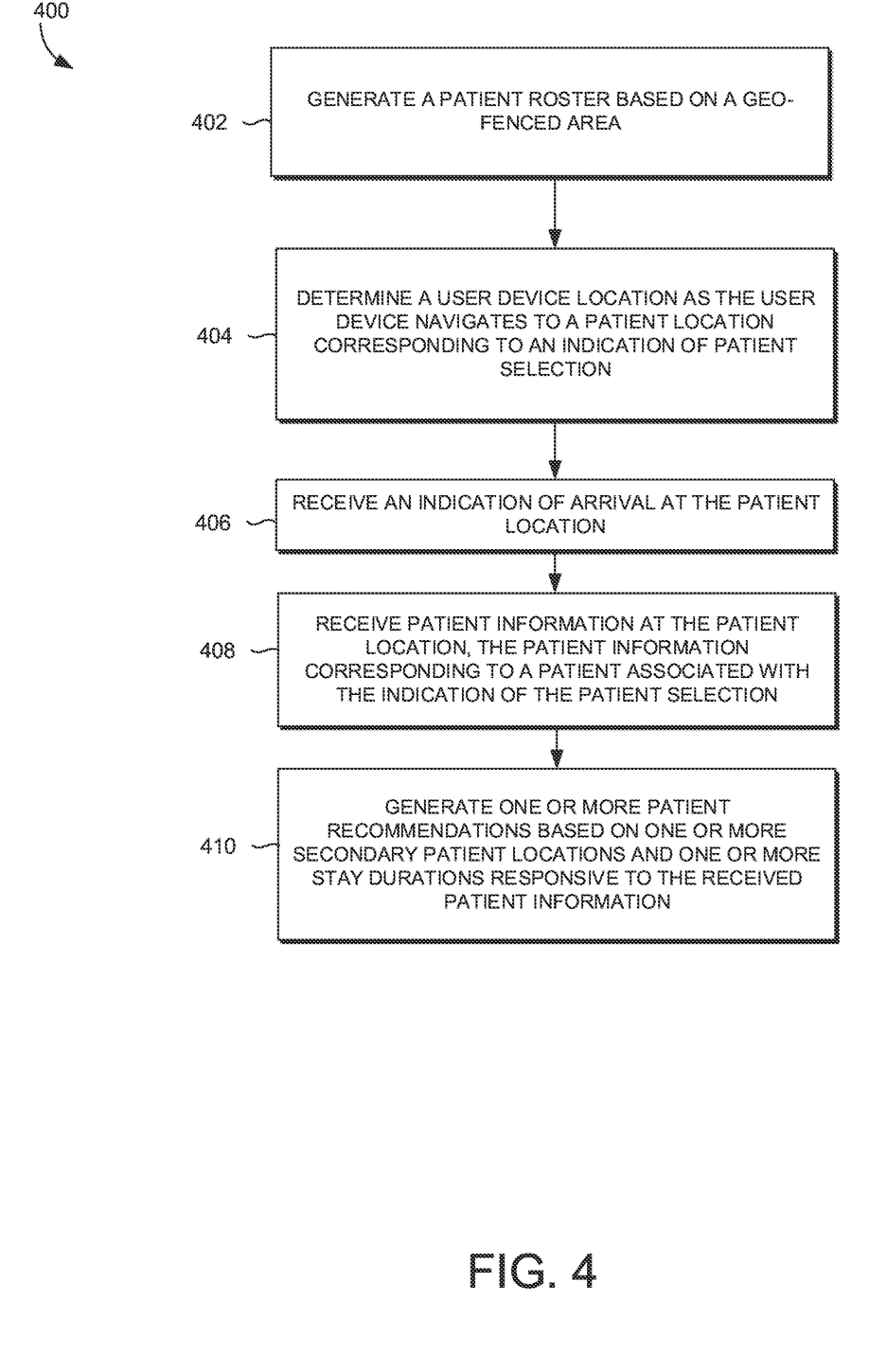
FIG. 4 is a flow diagram showing an exemplary method for utilizing health resources and enhancing healthcare coverage based on patient location, in accordance with various embodiments of the present disclosure.

Referring now to FIG. 4 which depicts a flow diagram of an exemplary method 400 for utilizing health resources and enhancing healthcare coverage based on patient location, in accordance with an embodiment of the present invention. The method may be performed by any computing device (such as computing device described with respect to FIG. 1) with access to an health resource system (such as the one described with respect to FIG. 2) or by one or more components of the health resource system and/or the health resource navigation system described with respect to FIGS. 2 and 3.

As shown at 402, a patient roster (e.g., a suggested list of patients and/or patient locations) is generated based on a geo-fenced area. The patient roster may include at least one identifier (e.g., a patient name and/or any other suitable identifier such as a medical record number) correlating to at least one patient. The patient data may be tagged with one or more patient locations that are correlated to one or more patients. Accordingly, the health resource navigation system may generate the patient roster based on the patient location(s) nearest to the user device location. The health resource navigation system may provide the patient roster to the user device. Alternatively or additionally, the user device may display or output, via a user interface, the patient roster.

At 404, the user device location is determined as the user device navigates to a patient location corresponding to an indication of patient selection. The indication of the patient selection may correlate to one or more patients and/or patient locations that may be selected based on the click of a button. The user device location may correlate to a longitude location and a latitude location of the user device in real-time or near real-time. In some embodiments, the health resource navigation system may provide directions that may assist the healthcare resource with navigating to the patient location(s) selected.

In some embodiments, an indication of arrival at the patient location is received by the health resource navigation system at 406. The indication of arrival (e.g., a notification of arrival) may be received in real-time or near real-time when the user device reaches the patient location. In some embodiments, the indication of arrival may be received when a button (e.g., a check-in button) is clicked via a user interface of the user device. In turn, a timer may be initiated that tracks a stay duration such that the health resource navigation system may track the time spent per patient.

Patient information is received at the patient location at 408. The patient information (e.g., exam information, chart information, and/or any other suitable health information) may correspond to the patient associated with the indication of the patient selection.

Alternatively or additionally, at 410, one or more patient recommendations are generated based on one or more secondary patient locations and one or more stay durations responsive to the received patient information. The health resource navigation system may generate a secondary patient roster based on the geo-fenced area and/or the user device location in real-time or near real-time. The user device may output (e.g., display) the patient recommendation(s) via a user interface associated with the user device.

As can be understood, the present invention provides systems and methods for a health resource navigation system 210 configured to track, monitor, and/or generate recommendations corresponding to mobile health resources based on patient location(s). The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and within the scope of the claims.

What is claimed is:

1. A non-transitory computer-readable storage media having computer-executable instructions embodied thereon that, when executed by one or more processors, cause the processors to:

track a user device location of a user device by a health resource navigation system based on at least GPS signals associated with the user device, wherein the user device is associated with a healthcare resource as the user device navigates and moves;

wherein the user device is tracked in real-time or near real-time at a plurality of points in time using communications from at least the user device and a networked communication system using at least the GPS signals;

correlate the user device location to a longitude location and a latitude location of the user device in real-time or near real-time;

track, by the health resource navigation system, the user device location in relation to one or more pre-defined geo-fenced areas by sequentially determining pairs of longitude locations and latitude locations of the user device observed at one or more points in time;

determine, based on at least the pairs of longitude locations and latitude locations of the user device, whether the user device location is within a threshold distance relative to an outer boundary of a first geo-fenced area from the one or more pre-defined geo-fenced areas;

in response to the threshold distance being met, generate a notification that the user device has reached the first geo-fenced area and transmit the notification to the user device via network communications;

in response to the threshold distance being met relative to the first geo-fenced area, generate a patient roster, on a display of the user device, based on the first geo-fenced area, wherein the patient roster comprises patients having patient locations that are within the first geo-fenced area;

wherein generating the patient roster based on the first geo-fenced area including accessing a database containing patient data that is tagged with one or more patient locations that are correlated to one or more patients and determining patients that are within the first geo-fenced area;

in response to the patient roster being generated, identify and display, on the user interface of the user device, a first set of patients from the generated patient roster that have patient locations within the first geo-fenced area that is nearest to the user device location as the user device location is being tracked;

wherein each patient from the first set of patients is selectable on the user interface;

in response to receiving a selection from the user interface associated with a selected patient, sequentially determine additional pairs of longitude locations and latitude locations of the user device observed at one or more points in time to determine the user device location as the user device navigates to a selected patient location associated with the selected patient from the patient roster;

generate and transmit an indication of arrival at the selected patient location when the user device location, based on at least the additional pairs of longitude locations and latitude locations, is determined within a threshold distance from the selected patient location of the selected patient;

retrieve, from a database, patient information from electronic health records corresponding to the selected patient; and generate one or more recommendations to visit a second set of patients that have patient locations within the first geo-fenced area that may be visited within a time period after being at the selected patient location and based on at least one or more stay durations responsive to the patient information.

2. The computer-readable storage media of claim 1, wherein the patient roster includes at least one identifier correlating to at least one patient.

3. The computer-readable storage media of claim 1, wherein patient data associated with one or more patients is tagged with one or more patient locations of one or more patients.

4. The computer-readable storage media of claim 1, wherein the user device location correlates to a longitude location and a latitude location; and wherein the communications from the user device and the networked communication system include the longitude location and the latitude location for tracking the user device location.

5. The computer-readable storage media of claim 1, wherein a timer tracks the stay duration of the user device at the patient location in response to the indication of arrival at the patient location.

6. The computer-readable storage media of claim 1, wherein the computer-executable instructions further include instructions that when executed cause the one or more processors to:

generate and display, on the user interface of the user device associated with a healthcare resource, the one or more pre-defined geo-fenced areas that are associated with the healthcare resource;

receive, by the health resource navigation system, a selection of a geo-fenced area from the user interface of the user device;

track, by the health resource navigation system, the user device location in relation to the selected geo-fenced area; and in response to the user device location being within the selected geo-fenced area, generate a second patient roster, on the display of the user device, wherein the patient roster comprises patients having patient locations that are within the selected geo-fenced area.

7. A method performed by a health resource navigation system implemented on at least one computer that is configured to communicate to a remote user device, the method comprising:

tracking a user device location of a user device by the health resource navigation system based on at least GPS signals associated with the user device, wherein the user device is associated with a healthcare resource as the user device navigates and moves;

wherein the user device is tracked in real-time or near real-time at a plurality of points in time using communications from at least the user device and a networked communication system using at least the GPS signals;

correlating the user device location to a longitude location and a latitude location of the user device in real-time or near real-time;

tracking, by the health resource navigation system, the user device location in relation to one or more pre-defined geo-fenced areas by sequentially determining pairs of longitude locations and latitude locations of the user device observed at one or more points in time;

determining, based on at least the pairs of longitude locations and latitude locations of the user device, whether the user device location is within a threshold distance relative to an outer boundary of a first geo-fenced area from the one or more pre-defined geo-fenced areas;

in response to the threshold distance being met, generate a notification that the user device has reached the first geo-fenced area and transmit the notification to the user device via network communications;

in response to the threshold distance being met relative to the first geo-fenced area, generating, via the health resource navigation system, a patient roster based on the first geo-fenced area, wherein the patient roster comprises patients having patient locations that are associated with locations within the first geo-fenced area;

wherein generating the patient roster based on the first geo-fenced area includes accessing a database containing patient data that is tagged with one or more patient locations that are correlated to one or more patients and determining patients that are within the first geo-fenced area;

identifying and displaying, on the user interface of the user device, a first set of patients from the generated patient roster that have patient locations within the first geo-fenced area that is nearest to the user device location as the user device location is being tracked;

wherein each patient from the first set of patients is selectable on the user interface;

providing, via network communications, the first set of patients from the patient roster to the user device and causing display of the first set of patients in a selectable form;

in response to receiving a selection from the user interface associated with a selected patient, sequentially determining additional pairs of longitude locations and latitude locations of the user device observed at one or more points in time and determining the user device location, based on at least the GPS signals associated with the user device, as the user device navigates to a patient location corresponding to the selected patient from the patient roster;

generating and transmitting an indication of arrival at the patient location when the user device location, based on at least the additional pairs of longitude locations and latitude locations, is determined within a threshold distance from the patient location of the selected patient;

retrieving, from a database, patient information corresponding to the selected patient; and generating one or more recommendations to visit a second set of patients that have patient locations within the first geo-fenced area that may be visited within a time period after the arrival at the patient location and based on at least one or more stay durations responsive to the patient information.

8. The method of claim 7, wherein the patient roster includes a plurality of identifiers correlating to a plurality of patients having patient data that is electronically tagged with one or more locations within the geo-fenced area or within a defined distance of the geo-fenced area.

9. The method of claim 7, further comprising generating a secondary patient roster based on a second geo-fenced area from the one or more pre-defined geo-fenced areas and patient locations that are within the second geo-fenced fended area.

10. The method of claim 7, wherein patient data associated with one or more patients is tagged with one or more patient locations of one or more patients.

11. The method of claim 7, wherein the user device location correlates to a longitude location and a latitude location, and
wherein the tracking includes determining the longitude location and the latitude location of the user device location from the communications from the user device and from the networked communication system.

12. The method of claim 7, wherein a timer tracks the stay duration of the user device at the patient location in response to the indication of arrival at the patient location.

13. The method of claim 7, wherein a notification is automatically generated and communicated in response to a longitude location and a latitude location associated with the user device location being within the threshold distance associated with the patient location.

14. The method of claim 7, wherein the patient information comprises at least one of exam information, chart information, or health information.

15. A system comprising:
one or more processors; and
a non-transitory computer storage media storing computer-useable instructions that, when executed by the one or more processors, cause the one or more processors to:
track a user device location of a user device by a health resource navigation system based on at least GPS signals associated with a user device, wherein the user device associated with a healthcare resource as the user device navigates and moves;
wherein the user device, that is remote to the health resource navigation system, is tracked in real-time or near real-time at a plurality of points in time using communications from at least the user device and a networked communication system using at least the GPS signals;
correlate the user device location to a longitude location and a latitude location of the user device in real-time or near real-time;
track, by the health resource navigation system, the user device location in relation to one or more pre-defined geo-fenced areas by sequentially determining pairs of longitude locations and latitude locations of the user device observed at one or more points in time;
determine, based on at least the pairs of longitude locations and latitude locations of the user device, whether the user device location is within a threshold distance relative to an outer boundary of a first geo-fenced area from the one or more pre-defined geo-fenced areas;
in response to the threshold distance being met relative to the first geo-fenced area, generate, via the health resource navigation system, a patient roster based on the first geo-fenced area, wherein the patient roster comprises patients having patient locations that are associated with locations within the first geo-fenced area;
identify and display, on the user interface of the user device, a first set of patients from the generated patient roster that have patient locations within the first geo-fenced area that is nearest to the user device location as the user device location is being tracked;
wherein each patient from the first set of patients is in a selectable form on the user interface;
in response to receiving a selection from the user interface associated with a selected patient, sequentially determine additional pairs of longitude locations and latitude locations of the user device observed at one or more points in time to track and determine the user device location, based on at least the GPS signals associated with the user device, as the user device navigates to a patient location corresponding to the selected patient from the patient roster;
generate and transmit an indication of arrival at the patient location when the user device location, based on at least the additional pairs of longitude locations and latitude locations, is determined within a threshold distance from the patient location of the selected patient;
retrieve, from a database, patient information corresponding to the selected patient; and
generate and display one or more recommendations to visit a second set of patients that have patient locations within the first geo-fenced area that may be visited within a time period after the arrival at the patient location and based on at least one or more stay durations determined at the patient location.

16. The system of claim 15, wherein the patient roster includes at least one identifier correlating to at least one patient.

17. The system of claim 15, wherein the user device location correlates to a longitude location and a latitude location; and
wherein the communications from the user device and the networked communication system include the longitude location and the latitude location for tracking the user device location.

18. The system of claim 15, wherein a timer tracks the stay duration of the user device at the patient location in response to the indication of arrival at the patient location.

19. The system of claim 15, wherein the patient information comprises at least one of exam information, chart information, or health information.

20. The system of claim 15, wherein the second set of patients is generated based on one or more patient locations nearest to the user device location at a point in time.

* * * * *